Aug. 25, 1925.
J. D. KARLE
1,551,157
FUEL SUPPLY FOR MOTOR VEHICLES
Filed Nov. 30, 1923    2 Sheets-Sheet 1
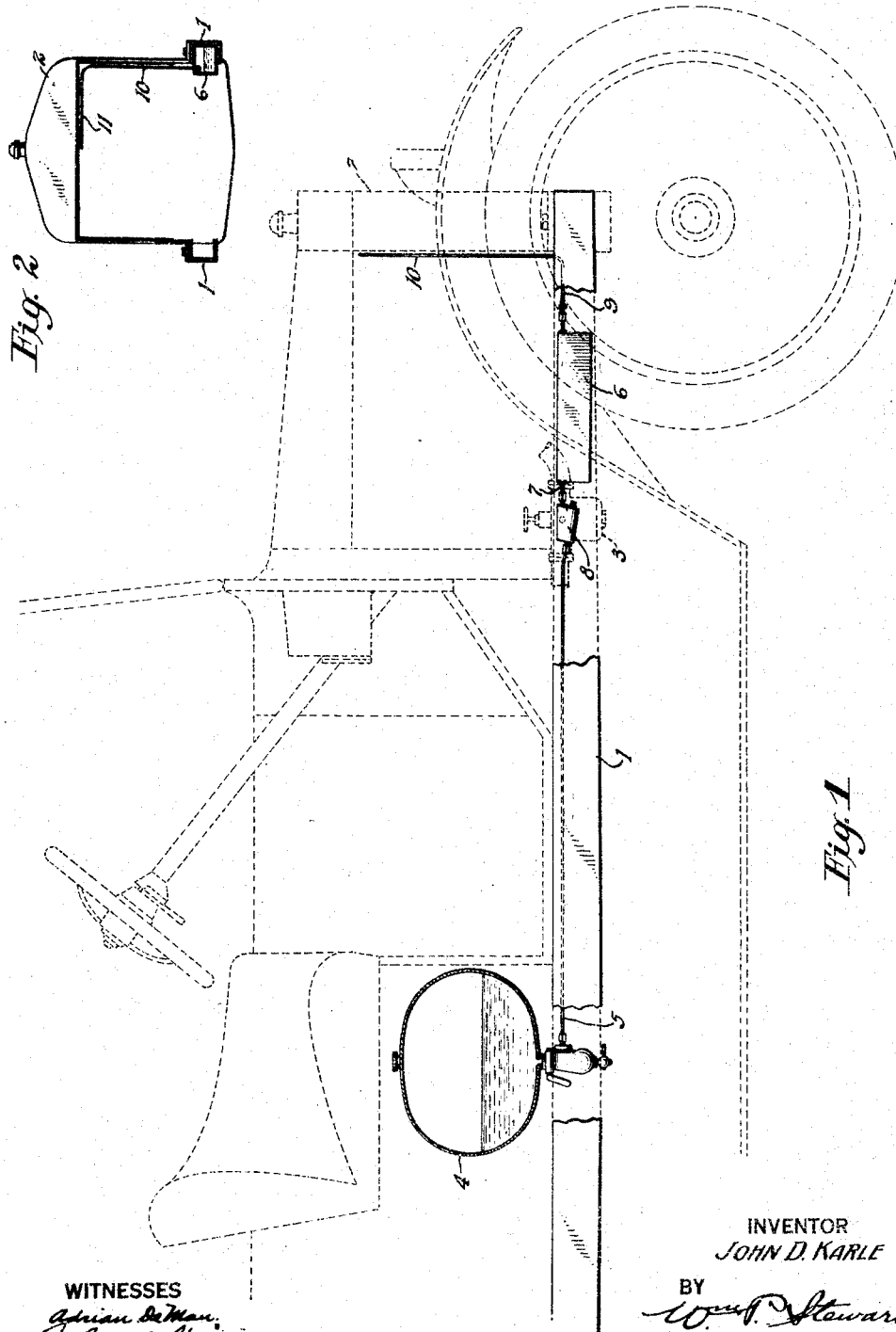
INVENTOR
JOHN D. KARLE
BY
*Wm. F. Stewart*
ATTORNEY
WITNESSES
*Adrian DeMan*
*John F. Heine*

Aug. 25, 1925.
J. D. KARLE
1,551,157
FUEL SUPPLY FOR MOTOR VEHICLES
Filed Nov. 30, 1923
2 Sheets-Sheet 2
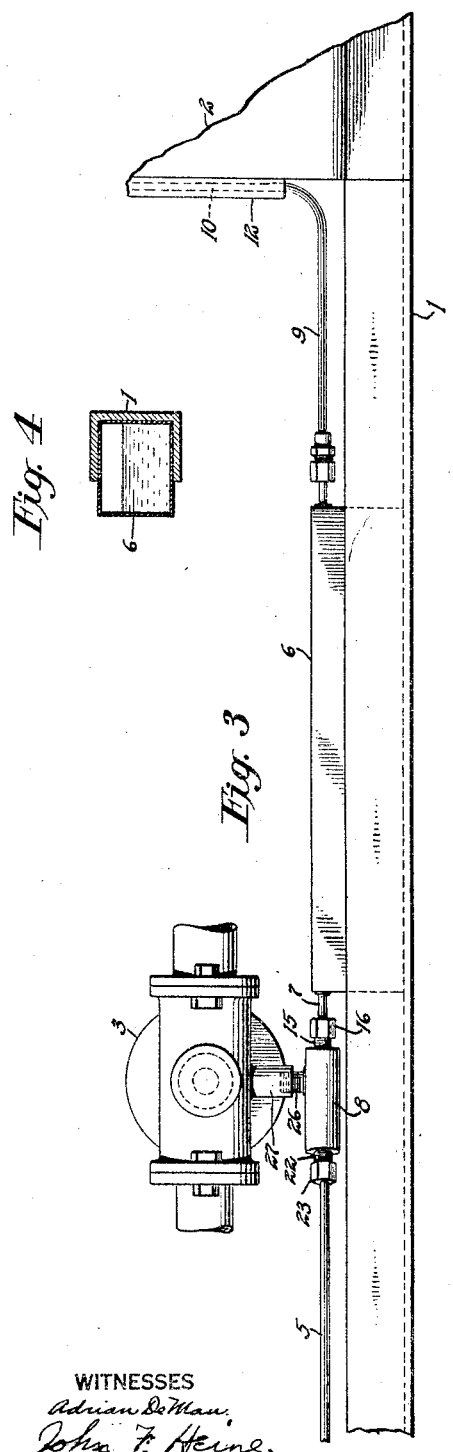
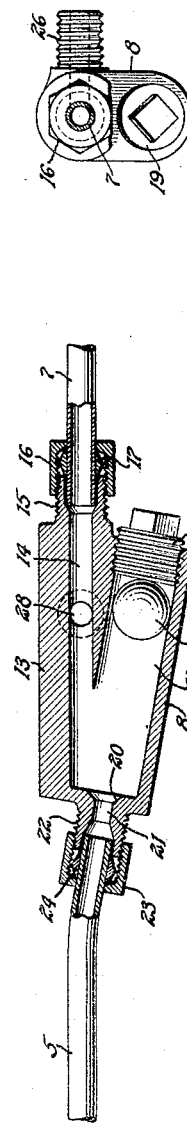
WITNESSES
Adrian DeMan
John F. Heing
INVENTOR
JOHN D. KARLE
BY
ATTORNEY Patented Aug. 25, 1925.

1,551,157

UNITED STATES PATENT OFFICE.

JOHN D. KARLE, OF ROSELLE PARK, NEW JERSEY.

FUEL SUPPLY FOR MOTOR VEHICLES.

Application filed November 30, 1923. Serial No. 677,709.

*To all whom it may concern:*

Be it known that I, JOHN D. KARLE, a citizen of the United States, residing at Roselle Park, in the county of Union and State of New Jersey, have invented certain new and useful Improvements in Fuel Supplies for Motor Vehicles, of which the following is a specification.

This invention relates to improvements in the fuel-supply provision for carbureters of internal combustion engines employed in motor-propelled vehicles and more particularly in the type of motor-propelled vehicles in which there is a gravity feed of the fuel from a fuel-tank to the carbureter, as for instance in the well known Ford automobile.

It is a fact that when in automobiles of this character the supply of fuel in the fuel-tank is relatively low, though sufficient for ordinary purposes, a great danger arises not only to the occupants of the vehicle but to others under the present congested traffic conditions, due to failure of feed of the fuel to the carbureter in ascending a hill, thus causing a stalling of the engine in a most precarious position. This event is so well known that various efforts have been made to overcome the difficulty by the provision of an additional or emergency fuel-supply tank disposed upon the side of the carbureter opposite to that of the usual fuel-tank.

The present invention has for its primary object to overcome the defects in the prior attempted solutions of this problem.

More specifically, the present invention has for an object to provide an auxiliary-tank forwardly of the carbureter so disposed as not only to avoid the unsightly appearance of a protruding tank on the outside of the framework and the attendant inconvenience of location adjacent the engine within the engine-hood, but to primarily safeguard the auxiliary-tank against incidental collisions which frequently cause a distortion and breakage of the front fenders, with a consequent danger to the auxiliary-tank and its fuel-feed connections as previously disposed.

Another object of this invention is to provide, in this combination, improved means for preventing the flow of the fuel back into the main-tank under conditions when it is desirable to supply the carbureter from the auxiliary tank.

Other objects will be apparent from the following description and claims.

In the accomplishment of the objects of this invention, the present improvement in its preferred embodiment comprises the addition to the usual main-tank and carbureter, of an auxiliary-tank disposed forwardly of the carbureter within the usual U-shaped chassis-frame. By this means the auxiliary-tank is thoroughly protected by the relatively rigid chassis-frame; no drilling of the framework is necessary to secure the tank in position; it does not interfere with access to the engine and the conduits are correspondingly simplified.

In order to supply fuel to the auxiliary-tank from the main-tank, I have connected them by a substantially horizontal fuel-conduit having a connection intermediate the ends thereof with the usual carbureter, whereby the conduit serves not only to fill the auxiliary-tank from the main-tank, but to direct the fuel from either tank to the carbureter.

Means are provided for preventing the flow of the fuel from the auxiliary-tank to the main-tank under hill climbing conditions by interposing in said conduit an improved check-valve comprising a valve-chamber inclined to said conduit and having main- and auxiliary-tank inlet-ports. Gravitationally disposed in said chamber is a ball of slightly less diameter than the chamber, said ball under substantially level driving conditions being disposed in the lower portion of said chamber, but when the front portion of the vehicle is raised beyond a predetermined angle, the ball under gravity action seeks a ball-seat in the main-tank inlet-port at the opposite end of the valve-chamber whereby the main-tank valve-port is closed and the fuel is directed to the carbureter from the auxiliary-tank.

In the accompanying drawings, Fig. 1 is a diagrammatic view illustrating in side elevation the application of the present improvement to a motor-vehicle. Fig. 2 is a detail view in rear elevation of the vehicle-radiator and illustrating the disposition of the auxiliary-tank vent-pipe. Fig. 3 is a top-plan view of a portion of the chassis-frame and carbureter, with the auxiliary-tank in the position it occupies in said frame. Fig. 4 is a sectional view of the chassis-frame through the auxiliary-tank.

Fig. 5 is a longitudinal sectional view of the check-valve. Fig. 6 is an end view of the check-valve as viewed from the right in Fig. 5.

Referring to the drawings, the present improvement is shown as applied to a well known type of motor-vehicle having a gravity feed of fuel from a supply tank to a carbureter, reference being made to only such parts thereof as are deemed essential to an understanding of the invention.

According to its usual construction, the chassis-frame 1 is substantially U-shaped in cross-section, affording the necessary strength and rigidity, and sustains at its forward end the radiator 2. Disposed adjacent one member of the chassis-frame 1 is the carbureter 3 and rearwardly thereof is located the usual fuel-tank 4 connected by means of a fuel-conduit 5 with the carbureter 3, whereby fuel is conducted under gravity action to said carbureter. It is well known that when the fuel-supply in the tank 4 is relatively low, though sufficient for ordinary purposes, and the vehicle is inclined to the horizontal as when ascending a hill, no fuel will be supplied to the carbureter by reason of the relatively different levels of the fuel-supply and the carbureter. That this is an extremely dangerous condition is apparent and it can not always be avoided because a hill encountered may prove unexpectedly steep, so that even a fair amount of fuel supply in the tank 4 will not suffice to prevent stalling of the engine of the vehicle. While prior efforts have been made to overcome this difficulty, along the lines of the present improvement they have lacked certain features in construction and arrangement present in this improvement and essential to a commercially practical solution.

Referring now more particularly to the present improvements, an elongated tank 6, auxiliary to the main-tank 4 is disposed forwardly of the carbureter within the U-shaped chassis-frame 1, as illustrated more particularly in Fig. 4. This auxiliary-tank 6 is connected at its rearward end, by means of a conduit 7, with a check-valve 8, interposed in the primary conduit 5. At its forward end, said auxiliary tank is suitably connected with the horizontal portion 9 of a vent-pipe preferably projecting forwardly to the rear side of the radiator 2 and having a vertical portion 10 curving into a lateral extension 11 terminating adjacent the upper portion of the radiator 2. This disposition of the vent-pipe affords protection therefor, particularly by reason of the usual provision of a flange 12 on the rear side of the radiators in vehicles of this character.

The check-valve 8 comprises a casing 13 provided longitudinally thereof with a bore or fuel-passage 14 terminating at one end in an externally-threaded reduced extension or boss 15 affording a port entered by the conduit 7 and coupled thereto by means of a compression-nut 16 and a clamp-washer 17. At its opposite end the fuel-passage 14 is intersected by a valve-chamber 18, preferably having a predetermined degree of downward inclination with respect to said passage 14 and the conduits 5 and 7. The valve-chamber 18 is internally threaded at one end to secure a sealing-plug 19 therein, and at its opposite end is formed or otherwise provided with a ball-seat 20 comprising the terminal of a port 21 formed in a reduced externally-threaded extension or boss 22. The port 21 is entered by the main-tank conduit 5 and is preferably coupled thereto by means of a compression-nut 23 and a clamp-washer 24. Disposed within the valve-chamber 18 to gravitationally traverse the same in opposite directions is a port-closing member in the form of a ball 25 of slightly less diameter than the bore of the valve-chamber 18 but adapted to snugly fit the ball-seat 20.

Projecting laterally from the check-valve 8 is an externally-threaded extension 26 threaded into the nipple 27 constituting the usual feed-pipe connection with the carbureter. The extension 26 is provided with a fuel-passage 28 intersecting the fuel passage 14 substantially at right-angles thereto, whereby the carbureter is supplied with fuel from either of said tanks.

It will be apparent from the foregoing description that there has been provided a substantially horizontal fuel-conduit between the main and auxiliary tanks, through the check-valve 8, whereby the auxiliary-tank is gravitationally supplied with fuel from the main-tank and whereby the fuel may be conducted to the carbureter from either of said tanks under the necessary conditions. These connections are clearly extremely simple in character, the disposition of the auxiliary-tank within the U-shaped chassis-frame being particularly advantageous as previously pointed out. It is essential however that in this combination of parts, efficient means be provided to check the flow of fuel from the auxiliary-tank into the main-tank when ascending a hill of such a grade that the main-tank is ineffective. By interposing in this circuit the present form of check-valve, the flow into and out of the main-tank is positively controlled at all times under gravity action, the ball 25 instantly seeking its seat 20 when ascending a hill of the necessary inclination to tilt the valve-chamber 18 in the opposite direction from its normal inclination to the horizontal, it being understood that the degree of normal inclination of the valve-chamber is predetermined to maintain the port 21 open under degrees of inclination of the vehicle during which the main-tank is still effective to supply fuel to the carbureter. In other words, the port 21 is automatically opened and closed under gravity action to meet the necessary conditions and this regardless of the direction of flow-pressure of the fuel, for it will be apparent that the ball 25 will traverse the chamber 18 in opposite directions under gravity action in accordance with the direction of inclination of the valve-chamber 18.

Having thus set forth the nature of the invention, what I claim herein is:—

1. The combination in a motor-vehicle having a substantially U-shaped chassis-frame, a carbureter disposed adjacent said chassis-frame, and a main fuel-tank disposed rearwardly of said carbureter, of an auxiliary-tank disposed forwardly of said carbureter within said U-shaped chassis-frame, a fuel-conduit connecting the main-tank with the upper rear portion of said auxiliary-tank, and a fuel-feed connection between said conduit and the carbureter, said tank-connecting conduit constituting means for supplying fuel from the auxiliary tank to the carbureter in an upwardly inclined position of the vehicle.

2. The combination in a motor-vehicle having a carbureter, and a main tank disposed rearwardly of said carbureter, of an auxiliary tank disposed forwardly of said carbureter below the level of the main tank, a fuel conduit connecting the main tank with the upper portion of said auxiliary tank, and a fuel-feed connection between said conduit and the carbureter, said tank-connecting conduit constituting means for supplying fuel from the auxiliary tank to the carbureter in an upwardly inclined position of the vehicle.

3. In a motor-vehicle having a carbureter, a main fuel-tank, an auxiliary fuel-tank disposed below the level of said main tank in a horizontal position of the vehicle, an open fuel-conduit connecting the bottom of the main tank with the upper portion of the auxiliary tank and with the carbureter, said conduit serving to supply fuel to the auxiliary tank from the main tank in a horizontal position of the vehicle and to the carbureter from the auxiliary tank in an inclined position of the vehicle and a check-valve interposed in said conduit including a member gravity-maintained in in-effective position in and after the vehicle leaves the horizontal position up to a pre-determined angle to the horizontal thereof and thereafter gravity-propelled into a position to prevent the flow of fuel from one of said tanks to the other.

4. In a motor-vehicle having a carbureter, a plurality of fuel-tanks for supplying fuel to said carbureter, an open fuel-conduit connecting the tanks and said carbureter, and a check-valve interposed in said conduit including a fuel port, a ball-guiding chamber inclined to the horizontal in the horizontal position of said vehicle, and a ball disposed within said chamber gravity-propelled to automatically prevent the flow of fuel from the auxiliary-tank to said main-tank in an upwardly inclined position of the vehicle.

5. In a motor-vehicle having a carbureter, a plurality of fuel-tanks for supplying fuel to said carbureter, an open fuel-conduit connecting the tanks and said carbureter, and a check-valve interposed in said conduit including a fuel port, a ball-guiding chamber inclined to the horizontal in the horizontal position of said vehicle, a ball disposed within said chamber gravity-propelled to automatically prevent the flow of fuel from one of said tanks to the other, and a detachable plug closing one end of said chamber.

6. The combination in a motor-vehicle having a carbureter, and main- and auxiliary-tanks disposed upon opposite sides of said carbureter in the direction of the length of the vehicle, of a conduit for supplying fuel to the auxiliary-tank from said main-tank and from each of said tanks to the carbureter, and a check-valve for preventing the flow of fuel from the auxiliary-tank to the main-tank, said check-valve including a fuel-passage, a valve-chamber intersecting said fuel-passage at an acute angle, a port connecting said fuel-passage and the main-tank, and a gravity-controlled port-closing ball disposed within said chamber.

7. The combination in a motor-vehicle having a carbureter, and a main-tank disposed rearwardly of said carbureter, of an elongated auxiliary-tank disposed substantially lengthwise of the length of the vehicle and forwardly of said carbureter below the level of the main-tank, a fuel-conduit connecting the main-tank with the upper rear portion of the auxiliary-tank, and a fuel-feed connection between said conduit and the carbureter, said tank connecting conduit constituting means for supplying fuel from the auxiliary-tank to the carbureter in an upwardly inclined position of the vehicle.

In testimony whereof I affix my signature.

JOHN D. KARLE.